June 7, 1927.
W. F. CHRISTEL
GRADER
Filed Jan. 10, 1925
1,631,517
3 Sheets-Sheet 1
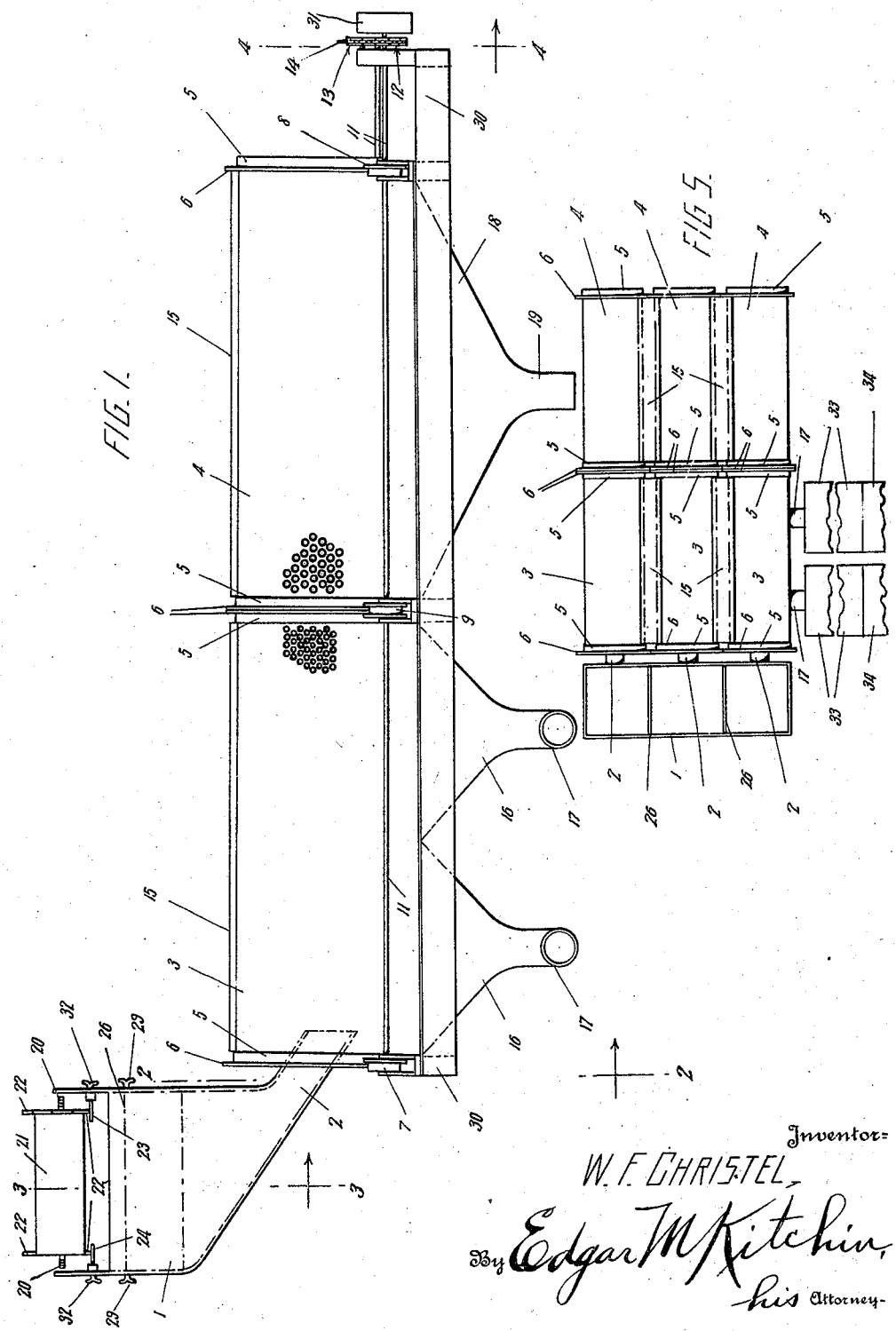

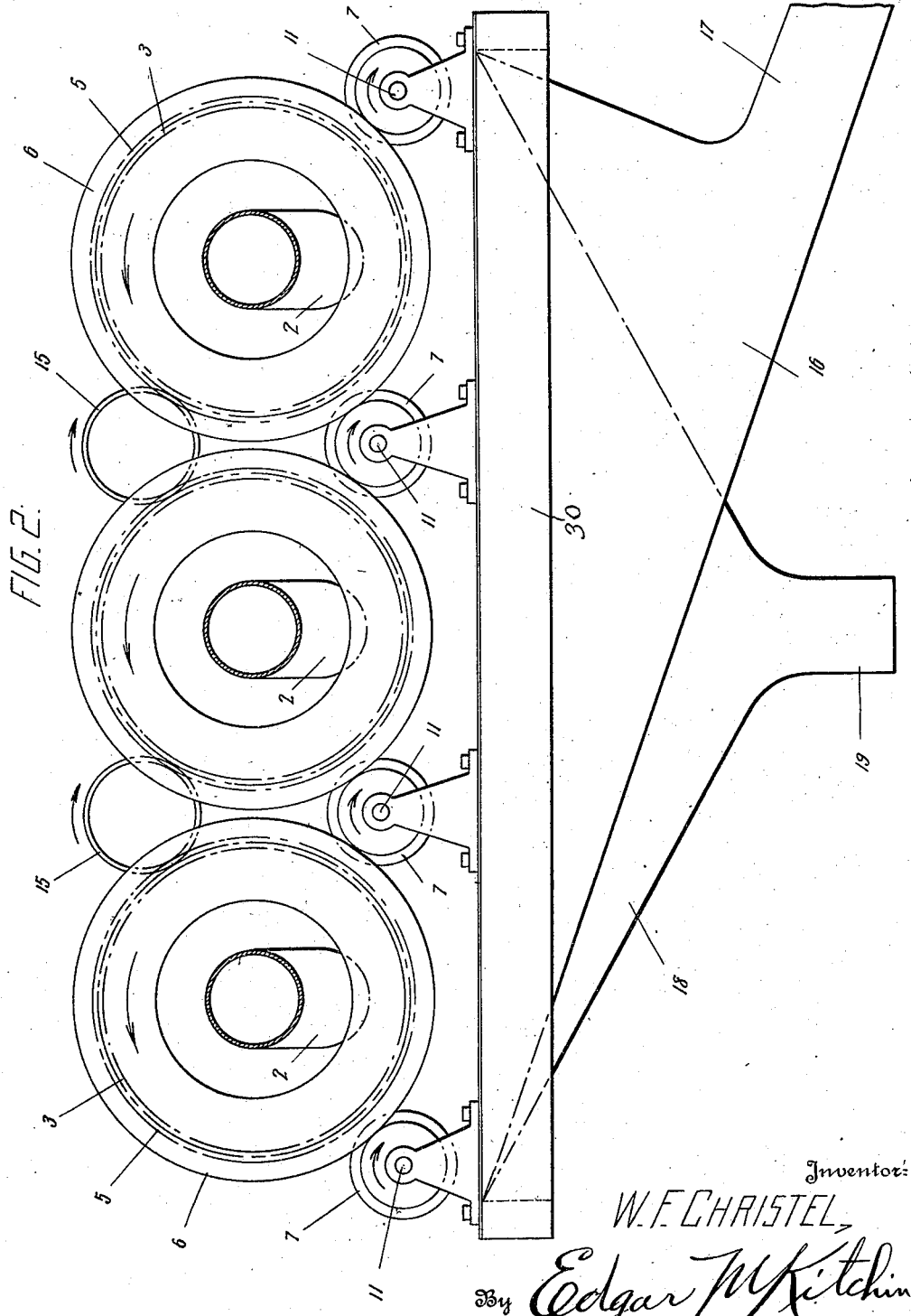

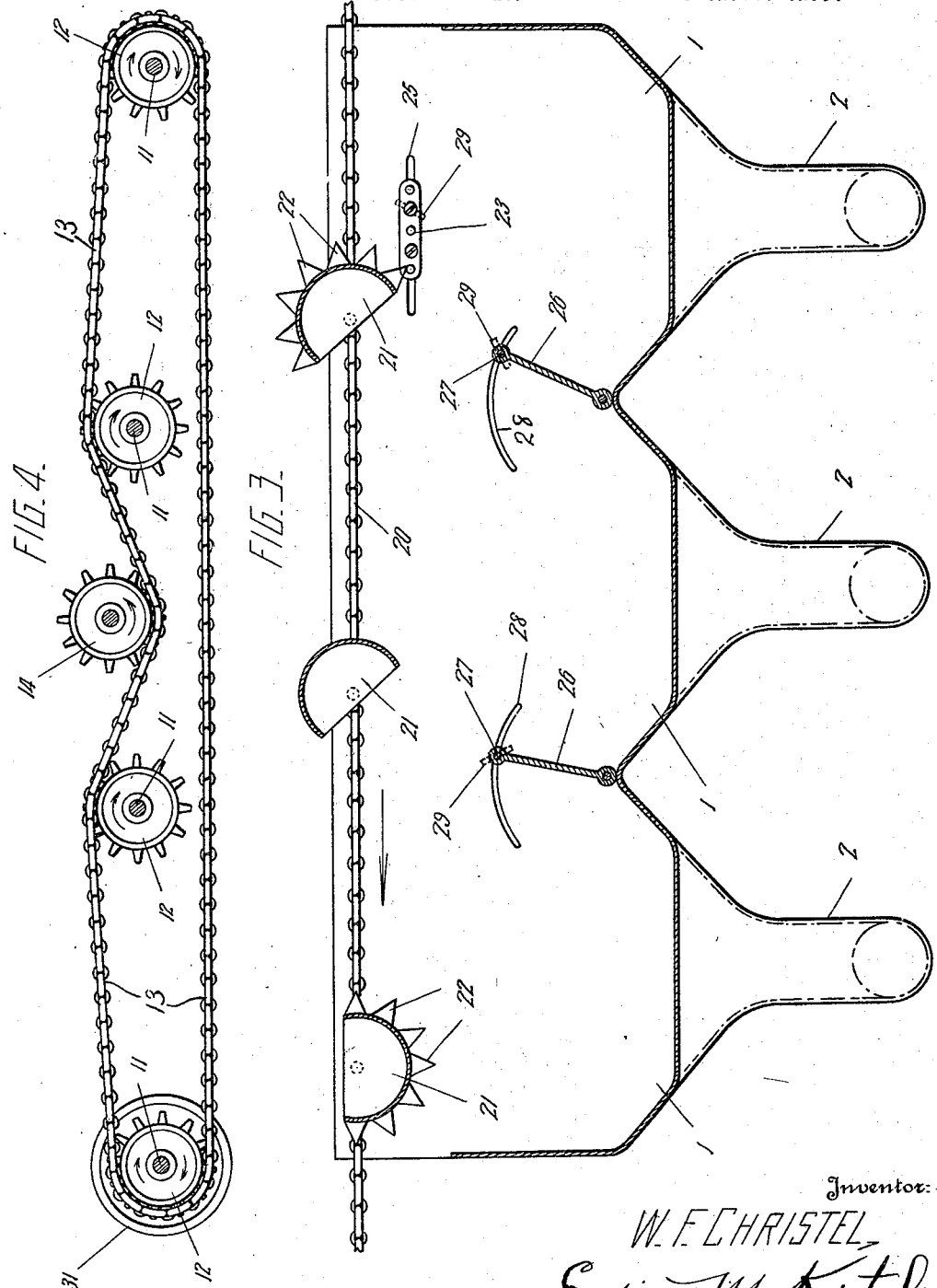

Patented June 7, 1927.

1,631,517

UNITED STATES PATENT OFFICE.

WILLIAM F. CHRISTEL, OF VALDERS, WISCONSIN.

GRADER.

Application filed January 10, 1925. Serial No. 1,676.

This invention relates to improvements in grading machines, and more particularly to such as are especially adapted for grading peas and like legumes and other seeds.

The primary object in view is the effective, ready, and inexpensive grading of the seeds as they come from the viner.

A further object in view is the segregation and grading of the larger seeds for relieving the load on subsequent grading machines.

A more detailed object is the effective regulation of the flow to the separating reels for insuring uniformity in the distribution of the seeds being graded.

With these and further objects in view as will in part hereinafter become apparent and in part be stated, the invention comprises certain novel constructions, combinations and arrangements of parts as subsequently specified and claimed.

In the accompanying drawings,—

Figure 1 is a view in side elevation of an apparatus embodying the features of the present invention, the supplemental grader being omitted.

Figure 2 is a vertical section taken on the plane indicated by line 2—2 of Figure 1, and looking in the direction indicated by the arrow, most of the parts being seen in elevation, and the parts being shown on an enlarged scale, and parts being broken away.

Figures 3 and 4 are transverse sectional views taken respectively on the planes indicated by lines 3—3 and 4—4 Figure 1, and looking in the direction indicated by the arrow, the parts being shown on the same scale as Figure 2.

Figure 5 is an outline, plan view of the parts seen in Figure 1 on a reduced scale, the conveyor being omitted, and fragments of the supplemental grader being seen.

It should be understood that while the embodiment of the invention illustrated in the accompanying drawings is particularly well adapted for use in the handling of various kinds of seeds, it is especially designed for the handling of green peas and other seeds in a condition where care must be exercised to avoid injury thereto.

Referring to the drawings by numerals, 1, 1 indicates hoppers which are arranged in the form of a battery, and may involve as many hoppers as desired, three being shown as effectively illustrating an embodiment of the invention. A discharge chute or spout 2 extends from each hopper 1 into the open intake end of a reticulated, screening or grading reel or drum 3, there being a reel 3 for each chute 2. A reel 4 is arranged in tandem with and disposed to receive the discharge from each reel 3. Each of reels 3 and 4, though shown only conventionally in the drawings, is in fact preferably of sheet metal perforated throughout as required for proper grading.

The apertures of reels 3 and 4 are proportioned according to the grading to be done, and each end of each reel 3 and 4 is preferably finished or bound by a ring 5 having an annular, outstanding flange 6, the flange 6 of the intake or front end of each reel 3 being mounted on rollers 7, 7, and the flange 6 at the discharge or rear end of each reel 4 is mounted on similar rollers 8. The flanges 6 at the meeting ends of the reels 3 and 4 are so juxtaposed as to ride on rollers 9. Rollers 7 and 8 are each flanged about one edge to engage the rear of flanges 6, and each roller 9 is double flanged to receive therebetween the two flanges of a pair of reels 3 and 4. The rollers 7, 8 and 9 are thus arranged in groups of three lengthwise of the reels, and each group is fixed to and carried by a longitudinally arranged driving shaft 11, there being four such driving shafts where three groups of the tandem reels 3 and 4 are employed corresponding with the three hoppers of the battery of hoppers 1. A supporting frame 30 is arranged with an upstanding bracket extending at the opposite sides of each of the rollers 7, 8 and 9 and formed with journal bearings sustaining the respective shaft 11. A driver 31 is fixed to one of the shafts 11 and receives power from belting or other appropriate source, not illustrated, and each of the shafts 11 is provided with a sprocket wheel 12, about which is laced the endless chain 13 for receiving power from the driver 31. An appropriate idler 14 is preferably located for tensioning the chain belt 13 and keeping one lap thereof in mesh with the sprockets 12 of the intermediate shafts 11, as best seen in Figure 4. It is to be observed that this arrangement for driving the several rollers 7, 8 and 9 is disclosed only as an appropriate method of such operation, and any other of various means for driving said rollers may be readily substituted. It is, however, important to observe that the several rollers 7, 8 and 9 are arranged below the major portion of the reels 3 and 4, and no mechanism or interfering parts, framing or otherwise, is arranged above the reels 3 and 4 to interfere with ready removal vertically upwardly of any or all of said reels, which greatly facilitates substitution whenever desired for any cause.

Idler drums 15, 15 rest by weight on the exterior surfaces of the reels 3 and 4, and are located between each two laterally disposed reels, as seen in Figure 2. Each drum 15 is held against longitudinal displacement or endwise movement by the rings 5 and otherwise retained by gravity in place, and each drum 15, incident to its frictonal contact wth reels 3 or 4, is rotated thereby in a direction reverse to the direction of rotation of the several reels 3 and 4, all of said reels rotating in the same direction, as is indicated by the arrows in the drawings, and as may be readily determined by the lacing of the drive chain 13. The several drums 15 function to retain the screens or openings of the reels 3 and 4 clean and free from seeds of sizes too large to pass through the openings and small enough to wedge therein. Each drum 15 is preferably formed as a hollow cylinder made of sheet material such as galvanized sheet iron, but may be constructed of any appropriate material, and should be heavy enough to retain its position while in rolling contact with the reels so as to clear the reels from wedged seeds and light enough not to injure either the reels or the seeds.

The lateral group of reels 3, being the forward reels of the several tandem groups, are provided with discharge hoppers 16, 16, each common to all reels 3, and each having a discharge chute or spout 17 extended to the desired point of delivery; and the lateral group of reels 4, being the rear reels of the tandem groups, are provided with a common discharge hopper 18 having a spout or chute 19 also extending to the desired point of delivery.

Each of the reels 4 has its rear end open for enabling ready discharge therefrom, and any appropriate receiver may be provided for such discharge. It is to be observed particularly that the ring or annulus 5 at the discharge end of each reel 4 is reversed in its location on the reel relative to the relation of all the other rings 5, so that the flange 6 of the ring 5 at the discharge end of each reel 4 is set forward along the respective reel a distance equal to the width of the ring 5, so that the rollers 8 engaging the flange 6 and supporting the rear ends of the reels 4 lie forward of the line of discharge from the rear end of each of the drums 4, leaving said rear end entirely clear for the delivery of the largest size seeds into such hopper or other receptacle or container as may be provided.

The hoppers 1 are designed to receive peas or other seeds to be separated from any appropriate source of supply, not illustrated, and the supply is preferably delivered to the hoppers by a commercially known form of conveyor consisting of a belt 20, preferably in the form of endless chains, carrying pivotally suspended and preferably uniformly-spaced buckets 21, 21, each having tripping teeth 22 arranged at one end. The teeth 22 are preferably arranged at one end of one of the buckets 21, and at relatively the opposite end of the next bucket 21, and so on alternately throughout the length of the belt 20. The conveyor made up of the belt 20 and buckets 21 and carrying and driving mechanism therefor, not illustrated, extends from any appropriate source of supply, such, for example, as the discharge from a viner. The conveyor is arranged to travel in a direction from right to left with the parts in the position seen in Figure 3, and the upstanding wall of the first hopper 1, or other appropriate support, carries a tripping rack 23 at one side of the first hopper, and an identical tripping rack 24 is similarly carried by an upstanding wall, or other appropriate support, at the other side of the second hopper 1, so that the pins or teeth of the rack 23 will engage the tripping teeth 22 of those buckets 21 having their teeth at the righthand end as viewed in Figure 1, while the pins or teeth of the tripping rack 24 will engage the teeth 22 of each alternate bucket. Dumping of the buckets as they pass over the hoppers 1 is thus effectively accomplished, and in order to adjust the point or location of the dumping, the support for the respective racks 23 and 24 is provided with a slot 25, and each rack is provided with a securing bolt extending through the slot and engaged by a clamping wing nut 32, whereby the racks 23 and 24 may be adjusted in a direction longitudinally of and parallel to the travel of the conveyor 20. Thus, the racks 23 and 24 may be set to cause the buckets to discharge their loads substantially uniformly respectively into the first and second chutes and into the second and third chutes. However, the flow from the buckets to the chutes and thence to the reels may not be caused to be exactly uniform in this way, and in order to insure uniformity of such flow, so that exactly the same amount will be delivered to each drum 3 in a continuous and uniform stream, the vertical dividing walls between the hoppers are formed into adjustable gates 27, each pivoted at its lower edge along the apex of the jointure between the two adjacent hoppers. An appropriate rod 27 engages the upper edge of each gate 26 and has its ends extending beyond the respective gate through slots 28 formed in the side walls of the hoppers. A locking wing nut 29 is threaded onto one of the projecting ends of each rod 27 for locking the respective gate 26 in any desired angular position as found necessary to insure uniformity of the flow of peas or other seeds to the several hoppers 1.

In operation, the racks 23 and 24 and the gates 26 are carefully adjusted and set according to the load being delivered by the conveyor to insure continuous and uniform flow of seeds through all of the chutes 2. The separation progresses in natural and regular course and is susceptible of use with a great variety of seeds or like substances to advantage, but it may be helpful to an appreciation of the value of the present improved apparatus to understand a detail, specific illustration of use commercially. To this end, it is explained that, when running the "Sweet" variety of peas, the reels 3 will have a mesh of twelve thirty-seconds of an inch, while the reels 4 will have a mesh of fourteen thirty-seconds of an inch. Thus the commercially recognized sizes of peas, 1, 2, 3 and 4, will all pass through the openings of the reels 3 and be delivered through the chutes 17 to another grader, as hereinafter mentioned, such as that above described, or to any other form of grader desired. The seeds of commercial sizes 1, 2, 3, and 4 are, therefore, "throughs" relative to the initial grading reels. Sizes 5 and 6 will, however, move on into the reel 4 and size 5 will be discharged therefrom into hopper 18 and through the chute 19 to the point of consumption, such as to apparatus for canning or the like. The seeds of sizes 5 and 6, therefore, are "tailings" relative to the initial grading reels, and the seeds of size 5 become "throughs" relative to the second set of grading reels. The seeds of size 6 will pass on and be discharged out the rear end of the reels 4, as the "tailing" of reels 4, and received into containers or otherwise for similar consumption. As the usual run of "sweets" averages approximately fifty per cent 5's and 6's, the smaller peas passing out the chutes 17 will represent only about one-half the initial load, and thus a substantial percentage of the load is removed from the subsequent grading machine. This same principle applies when handling the Alaska variety, except that the 4's and 5's are delivered into the reels 4, and the first three sizes are discharged through the chute 17 for further grading.

Green peas or like articles, which present difficult problems in grading incident to their liability to injury from excessive handling or from being crushed under the weight of a full load in a large drum or reel, cannot be graded successfully by apparatus which would be entirely acceptable and efficient in grading dried seeds, such as wheat and the like. Also, complete grading cannot be effected in a succession of tandem reels except by delivery of the whole load to the second drum minus only a single size, and relief from the difficulties thus apparent is accomplished by the present invention, but, as the subsequently-to-be-graded load cannot be delivered longitudinally, the discharge from reels 3 is taken through hoppers 16 and chutes 17 laterally to a laterally-disposed grader, as seen in Figure 5, made up of reels 33, 33, and 34, 34, arranged with their axes at right angles to the axes of the reels 3, and corresponding in structure and function to reels 3 and 4; or the reels 33 and 34 may be two of a series of tandem reels of a number equal to the number of sizes delivered from reels 3.

While the size of the reels 3 and 4, as well as reels 33 and 34, is susceptible of some variation, they should all be limited in size by the functioning intended to be accomplished as distinguished from the larger sizes of reels heretofore utilized for taking care of the complete load. To make more definite and clear the exact meaning, it may be stated that, for grading green peas and the like, screening reels from eighteen inches to twenty inches in diameter accomplish the work most efficiently. Reels as heretofore utilized for carrying the whole load have ranged in diameter somewhere around sixty inches. The difference in functioning between the larger reels and the smaller reels is that, when green peas or the like are delivered to a screening reel sixty inches in diameter, they lay dormant for the greater part of the time of operation. That is to say, while the larger reel revolves the bulk of the peas lie against the walls of the reel and do not move relative to the reel until the motion of the reel lifts them beyond the angle of repose, which angle is materially increased in the functioning of the reel incident to the fact that many of the peas, or other seeds, are lodged in openings of the screen and not only delay downward rolling motion themselves but also delay corresponding motion on the part of contacting peas. The result is that the load of peas must be very substantially elevated before they begin to roll down the inclined wall of the larger screening reel, and when they do begin to roll, the larger seeds tend to outstrip the smaller ones and to blockade the openings of the screen before they are reached by the smaller ones. The grading or screening action occurs only during the rolling of the seeds, and when the machine is in full motion, the rolling operation will be repeated about five or six times with each revolution of the larger screen; whereas when a smaller screen ranging say from eighteen inches to twenty inches in diameter is employed, the load is in constant action, or substantially constant action. The seeds roll practically continuously with a resulting continuous grading or screening action. It should be borne in mind, of course, that this specific statement of proportions is not to be accepted as absolute and fixed, but is stated as indicating the preferably relative proportions, which is to say that, where peas and other seeds of like sizes are to be graded, reels of eighteen inches to twenty inches in diameter are preferable; whereas with smaller seeds screening reels of proportionally smaller diameter and with larger seeds screening reels of proportionally larger diameter would be employed. But in no case would it be desirable to provide that relative proportion which exists between seeds of the size of green peas relative to screening reels from fifty inches to sixty inches or more in diameter.

What is claimed is:—

1. In grading apparatus for green peas and the like, the combination of a grading, screening reel, means for delivering peas thereto, and a reel arranged at right angles to the first-mentioned reel and disposed to receive the discharge through the reticulations of the first-mentioned reel for further grading.

2. In grading apparatus for green peas and the like, the combination of an initial grading reel, and reels for subsequent grading, one of the last-mentioned reels being disposed to receive the endwise discharge from the initial grading reel and another of the second mentioned reels being disposed to receive the discharge through the reticulations of the first-mentioned reel.

3. In grading apparatus for green peas and the like, the combination of an initial grading reel, and reels for subsequent grading, one of the last-mentioned reels being disposed to receive the endwise discharge from the initial grading reel and another of the second-mentioned reels being disposed to receive the discharge through the reticulations of the first-mentioned reel, the second-mentioned reel of the subsequent grading reels being disposed substantially at right angles to the initial grading reel.

4. In grading apparatus for green peas and the like, the combination of means for initially grading a load into distinct units, means for delivering a load continuously and uniformly to said initial grading means, and means for subsequently independently grading each of the units.

5. In grading apparatus for green peas and the like, the combination of a plurality of initial graders, means for delivering a load uniformly and equally to all of said graders, and means for subsequently grading the several discharges from said graders independently of each other.

6. In the art of grading green peas and the like, distributing as a continuous operation a load uniformly, simultaneously and equally to a plurality of initial graders, and subsequently grading the several discharges from the initial graders.

7. In grading apparatus, the combination, of laterally-grouped rotatably mounted screening reels and a roller mounted loosely upon and between the reels to be supported directly and solely by the reels and to rotate freely on the surface thereof.

8. In grading apparatus, the combination, of laterally-grouped rotatably mounted screening reels and a tubular roller mounted loosely upon and between the reels to be supported directly and solely by the reels and to rotate freely on the surface thereof.

9. In grading apparatus, the combination of screening reels arranged in tandem, each having a ring at each end having an annular flange, the flanges at the meeting ends of the reels being juxtaposed, and rollers receiving said flanges for supporting the reels, the rollers engaging the intermediate flanges being grooved and of a width sufficient to receive both flanges, and means for rotating said rollers.

10. In grading apparatus for green peas and the like, the combination of a plurality of initial grading means for grading a load into distinct units, means for delivering the load continuously uniformly to all of said initial grading means, and means for subsequently grading the "throughs" from the initial grading means and for subsequently grading the "tailings" from the initial grading means independently of the "throughs".

In testimony whereof I affix my signature.

WILLIAM F. CHRISTEL.